(12) United States Patent
Nordin et al.

(10) Patent No.: US 9,067,674 B2
(45) Date of Patent: Jun. 30, 2015

(54) PLASMA-ENHANCED ACTIVE LAMINAR FLOW ACTUATOR SYSTEM

(75) Inventors: Pontus Nordin, Linköping (SE); Göte Strindberg, Linköping (SE)

(73) Assignee: SAAB AB, Linkoeping (SE)

( * ) Notice: Subject to any disclaimer, the term of this patent is extended or adjusted under 35 U.S.C. 154(b) by 235 days.

(21) Appl. No.: 13/821,196

(22) PCT Filed: Sep. 15, 2010

(86) PCT No.: PCT/SE2010/050991
§ 371 (c)(1),
(2), (4) Date: Apr. 15, 2013

(87) PCT Pub. No.: WO2012/036602
PCT Pub. Date: Mar. 22, 2012

(65) Prior Publication Data
US 2013/0291979 A1    Nov. 7, 2013

(51) Int. Cl.
*B64C 23/00* (2006.01)
*B82Y 30/00* (2011.01)
(Continued)

(52) U.S. Cl.
CPC .............. *B64C 23/00* (2013.01); *B64C 23/005* (2013.01); *B82Y 30/00* (2013.01); *F15D 1/0075* (2013.01);
(Continued)

(58) Field of Classification Search
CPC .. B64C 23/00; B64C 23/005; B64C 2230/12; B64C 2230/04; B82Y 30/00; Y02T 50/166; F15D 1/12; F15D 1/0075; H05H 1/2406; H05H 2001/2418
USPC .................................................. 244/204, 205
See application file for complete search history.

(56) References Cited

U.S. PATENT DOCUMENTS 7,380,756 B1 *  6/2008  Enloe et al. ................... 244/175
7,624,941 B1    12/2009  Patel et al.
(Continued)

FOREIGN PATENT DOCUMENTS

EP           1995173 A1 *  11/2008  ............. B64C 23/00
WO    WO 2007/133239 A2    11/2007
(Continued)

OTHER PUBLICATIONS

International Searching Authority, Written Opinion (First) for International Application No. PCT/SE2010/050991, mailed Jan. 6, 2011, The Swedish Patent and Registration Office, Sweden.
(Continued)

*Primary Examiner* — Valentina Xavier
(74) *Attorney, Agent, or Firm* — Alston & Bird LLP (57) ABSTRACT

The invention regards a plasma-enhanced active laminar flow actuator system (1) adapted to an aerodynamic surface (3) which has a nano-engineered composite material layer (5) comprising a set of electrodes arranged (7', 7") in at least an upper (P1) and a lower (P2) plane extending parallel with the aerodynamic surface (3); the electrodes (7', 7") comprising nano filaments (9); the electrodes (7') of the upper plane (P1) are arranged in the aerodynamic surface (3) such that they define a smooth and hard aerodynamic surface (3); conductors (11, 11') of nano filaments (9") arranged for electrical communication between a control unit (13) and each of the electrodes (7', 7"), wherein the control unit (13) is adapted to address current between cooperating electrodes (7', 7") of the upper and lower plane (P1, P2) from a current supply depending upon air flow characteristic signals fed from air flow sensor means (19).

43 Claims, 6 Drawing Sheets

(51) Int. Cl.
F15D 1/00 (2006.01)
H05H 1/24 (2006.01)
(52) U.S. Cl.
CPC ..... *H05H 1/2406* (2013.01); *H05H 2001/2418* (2013.01); *Y02T 50/166* (2013.01); *B64C 2230/12* (2013.01)

(56) References Cited

U.S. PATENT DOCUMENTS

| | | | |
|---|---|---|---|
| 8,220,753 B2* | 7/2012 | Silkey et al. | 244/205 |
| 8,523,115 B2* | 9/2013 | Essenhigh et al. | 244/205 |
| 8,636,254 B2* | 1/2014 | Hansen et al. | 244/205 |
| 8,727,286 B2* | 5/2014 | Silkey et al. | 244/205 |
| 8,890,347 B2* | 11/2014 | Tanaka et al. | 290/44 |
| 8,916,795 B2* | 12/2014 | McClure et al. | 219/121.51 |
| 2006/0038087 A1* | 2/2006 | Minick et al. | 244/205 |
| 2008/0023589 A1* | 1/2008 | Miles et al. | 244/205 |
| 2008/0236656 A1 | 10/2008 | Solomon | |
| 2009/0173837 A1 | 7/2009 | Silkey et al. | |
| 2009/0212164 A1* | 8/2009 | Osborne et al. | 244/205 |
| 2010/0329838 A1* | 12/2010 | Greenblatt | 415/1 |
| 2012/0193483 A1* | 8/2012 | Essenhigh et al. | 244/205 |

FOREIGN PATENT DOCUMENTS

| | | |
|---|---|---|
| WO | WO 2008/045109 A2 | 4/2008 |
| WO | WO 2009/080048 A2 | 7/2009 |

OTHER PUBLICATIONS

European Patent Office, Extended European Search Report for Application No. 10857345.2, May 13, 2014, 5 pages, Germany.
International Searching Authority, International Search Report for International Application No. PCT/SE2010/050991, Jun. 1, 2011, 5 pages, The Swedish Patent and Registration Office, Sweden.
Saab AB, Applicant's Response to Jun. 1, 2011 Written Opinion of ISA/SE under PCT Rule 43bis.1 for International Application No. PCT/SE2010/050991, May 10, 2012, 4 pages, Sweden.
International Preliminary Examining Authority, Second Written Opinion for International Application No. PCT/SE2010/050991, Sep. 3, 2012, 4 pages, Swedish Patent and Registration Office, Sweden.
International Preliminary Examining Authority, International Preliminary Report on Patentability for International Application No. PCT/SE2010/050991, including Applicant's Oct. 30, 2012 Response to the Second Written Opinion, Dec. 19, 2012, 9 pages, Swedish Patent and Registration Office, Sweden.

* cited by examiner

PLASMA-ENHANCED ACTIVE LAMINAR FLOW ACTUATOR SYSTEM

CROSS REFERENCE TO RELATED APPLICATIONS

This application is a national stage application, filed under 35 U.S.C. §371, of International Application No. PCT/SE2010/050991, filed Sep. 15, 2010, the contents of which is hereby incorporated by reference in its entirety.

BACKGROUND OF THE INVENTION

1. Related Field

The present invention relates to a plasma-enhanced active laminar flow actuator system according to the preamble of claim 1 and one or more nano-engineered composite material layer(s), which serves as an aerodynamic surface during use, comprising components of the system according to claim 12.

2. Description of Related Art

An aerodynamic structure (e.g. an aircraft wing or a wind turbine blade, etc.) moving through the air typically has a condition of mainly turbulent air flow over the main part of the airfoil. The limited amount of laminar flow over wings and other aerodynamic surfaces, including a fuselage, is limiting the aerodynamic efficiency and fuel efficiency of current aircraft and the efficiency of a wind power station. Prior art aerodynamic surfaces are not designed and manufactured to the level of accuracy which is needed for laminar flow over a significant area (depending on the application, different for aircraft wing than for turbine blade) of these surfaces. It is known that a plasma field can improve the laminar flow over aerodynamic surfaces. However, known techniques present solutions where the plasma actuators have a limited efficiency and are not suited for a robust system with precise control management.

Natural laminar flow (NLF) of air over a wing or other aerodynamic surfaces will reduce drag, improve lift and improve the efficiency of the air foil. NLF is normally achieved by having a very accurate and smooth wing profile, which is fabricated in such way that it has significantly less geometrical steps, gaps and other deviations, e.g. waviness, than normally used technologies.

NLF can be achieved at certain airflow speeds and with certain wing profile configurations. It is more difficult to achieve at high speed and with swept wings due to cross flow over such wings.

US 2009/0212164 discloses improvement of the laminar flow over an aerodynamic surface using plasma generators comprising electrodes made of copper strips coupled to a control unit.

US 2009/0173837 discloses improvement of the laminar flow over an aerodynamic surface using plasma generators comprising electrodes including stainless steel.

Similar solutions have been experimentally verified but commercial use of these technologies is very limited or non-existing today, primarily due to lacking efficiency of the plasma generators based on existing technology and costly manufacture of the airfoil skin that would have to be fabricated to a very high surface quality.

Nano structure technology (such as nano fibres/tubes in polymeric materials) is an emerging technology of interest to the aircraft and windpower industry.

US 2006/0038087 discloses a system for augmenting the apparent velocity and effectiveness of an airfoil including electrodes made of nano tubes, wherein some of the electrodes are positioned on or above the upper surface of the airfoil.

It is desirable to provide a robust plasma-enhanced active laminar flow actuator system which improves the aerodynamic efficiency and which is energy efficient. It is also desirable to provide a product layer for the active laminar flow actuator system, which is cost-effective to produce and apply to an airfoil already in use or under development.

It is further desirable to provide a product layer for the active laminar flow actuator system which has an aerodynamic surface which is hard (erosion resistant) and ageing resistant.

An objective is also to eliminate drawbacks of known techniques, develop them and improve the application of the active laminar flow product layer in a robust system.

BRIEF SUMMARY

This has been achieved by the plasma-enhanced active laminar flow actuator system defined in the introduction being characterized by the features of the characterizing part of claim 1.

The aerodynamic surface is defined as an outer surface of an airfoil, over which surface the airflow flows during use. The aerodynamic surface may belong to an airborne platform, a high speed train, a wind turbine blade etc.

A system is achieved in such way that it is robust and has an aerodynamic surface which can be manufactured to be both smooth (high surface finish) and hard (damage resistant and erosion resistant).

It is important to understand that in order for the invented system to work properly, a number of required conditions have to be met: The first condition is that very strict requirements on surface quality in the affected airfoil area have to be met. Natural laminar flow will be promoted if the airfoil surface has a very precise and smooth surface, i.e. polished or fabricated in a way that results in a similar high surface finish. Also, surface waviness has to be controlled within very tight limits. This in turn puts very high requirements on the forming tools and curing process needed for curing of the skin laminates, in case these are manufactured from heat-curing composite prepreg materials such as carbon fiber reinforced epoxy resin or similar materials.

The second required condition for promoting laminar flow is that a suitable airfoil profile has to be used. Again, this airfoil profile has to be very precisely incorporated in the airfoil design and manufacturing, for similar reasons as the required surface finish.

A third required condition is the precise joining of structural elements or alternatively, absence of structural joints in the affected airfoil area. No steps or gaps of significance for the quality of laminar flow can be allowed in the affected area, especially not positive geometrical steps (a step which results in protrusion into the laminar flow).

If the three conditions described above exist, then the invented highly efficient plasma-enhanced active laminar flow actuator can be used to improve the laminar flow area and quality in the affected area. If one, two or three of the listed conditions do not apply, the use of the invented laminar flow actuators will not be useful since they cannot compensate for improper surface quality, correct airfoil profile or steps due to improper joining of structural parts. If one or several of above requirements is missing the result will be a laminar flow which is of reduced quality.

Due to the smooth and hard surface achieved by the embedded nano tubes in the nano-engineered composite material layer, the airfoil or vehicle moving through the air will have a very high aerodynamic efficiency, which reduces the fuel consumption and efficiency of the air foil. This is due to three required conditions listed in the previous section and the arrangement of new technology, highly efficient plasma-enhanced laminar flow actuators. air flow sensors, conductors (wires) and electrodes made of nano filaments, preferably conductive carbon nano tubes. These conductive nanotubes are arranged in a dielectric material, thereby forming a nano-engineered composite material, comprising one or more individual layers. The arrangement of nanotubes and/or individual layers in the nanocomposite material are sufficiently insulated by the dielectric material (layers) as needed for the described applications. The nano filaments or nano tubes adapted to constitute the conductors (wires) and electrodes are embedded in the nano-engineered composite material layer.

However, some or all electrodes of the upper plane may be exposed in the aerodynamic surface, but not to such extent that they bulge out. By arranging all of said components (conductors, electrodes, and the air flow sensors) comprising nano filaments, in the dielectric nano-engineered composite material layer, the nano-engineered composite material layer will be hard maintaining the smooth aerodynamic surface.

Thereby is achieved a robust system. In this way is it possibly to adapt high speed commercial and military aircraft with laminar flow configurations.

By the system is thus achieved controlled laminar flow for reduced drag and improved lift, increased stall angle and reduced stall speed.

By arranging sufficient number of air flow sensors (either separate sensors or using the laminar flow actuators in a sensing mode) in the dielectric material layer adjacent a respective electrode or between two cooperating electrodes, the control unit is able to control the activation of plasma fields in specific areas of the airfoil depending upon the actual and/or desired aircraft performance or airfoil performance. The air flow characteristics over a specific area of the aerodynamic surface are thus detectable and the electrodes related to this specific area are activated to maintain or change these characteristics. By using nano filaments for the design of the electrodes and wires in the dielectric material layer, the number of such specific areas can be considerable, due to the fact that the conductive nano filaments are not bulky, and thereby contributing to the robust system. By the robust system is thus achieved a precision in controlling the air flow, i.e. controlling the air flow condition of a specific area of the aerodynamic surface and the magnitude of the draught forcing the airflow down against the aerodynamic surface in this specific area. The electrodes may work as emitters or receivers independently of their positions in the layer. For example, one electrode in the upper plane may act as an emitter ionizing the air and one electrode of the lower plane acting as receiver to draw the ionized air flow by means of creation of a first electric field suitable for a first aircraft performance and the same electrode in the upper plane may act as an emitter and another electrode in the lower plane acts as receiver for creation of a second electric field suitable for a second aircraft performance. The air flow sensors are coupled with the control unit to form a closed loop system, allowing further reduction of the overall power consumption.

In such way improved electrical conductivity and plasma generation is achieved at the same time that geometric steps, gaps and waviness are within the required limits due to the airframe geometrical integration of nano filaments (such as carbon nano tubes having high electrical conductivity). Thereby is improved surface quality and promotion of laminar flow.

Each individual conductor consisting of nano filaments is electrically insulated from the others and a first end of each conductor is in electrical communication with respective electrode and a second end of each conductor is in electrical communication with an electrical bus and/or chip. Several chips may be arranged in the dielectric material layer for connection to a central bus. By the system is thus provided an intelligent dielectric material layer comprising a hard and smooth aerodynamic surface generating desired controllable plasma fields over precise portions or areas of the airfoil, which layer can be applied onto a current air foil or can be cured together with laminate lay-up for building an air foil.

The described invention may or may not need a surface protection with certain requirements, depending of the application. This protection is not described here. The system's nano-engineered composite material layer can be applied onto both metallic and non-metallic airfoils. Due to the hard and smooth surface, a reduction of accumulation of bug residue, dirt and other drag-inducing contaminants on airfoil and/or body surfaces is provided.

Preferably, the nano-engineered composite material layer of the aerodynamic surface is arranged on both sides of an aircraft wing or wind turbine blade. I.e. on upper wing skin panel and lower wing skin panel. This will improve the aerodynamic efficiency of the aircraft or application of choice.

In this way is achieved that the system can make use of a separate film, as nano-engineered composite material layer, which is attached to the airframe surface (compare so called paintless technology) and is also used as an alternative to a conventional paint layer improving the compatibility with other airfoil intelligence systems. The airframe noise will thus be reduced during take-off and landing, due to the improved aerodynamic efficiency. Also a wind power station will work less noisy.

Also is achieved reduced ice build-up during icing condition on laminar air flow aerodynamic surfaces, due to the smooth surface improving the aerodynamic efficiency.

Preferably, the nano-engineered composite material layer is applied in an engine air intake. Thus the hard and smooth aerodynamic surface provides for a laminar flow independently upon the aircraft's attitude. Also other intakes, such as intakes for environmental control systems, cooling etc. can be provided with the nano-engineered composite material layer. Typically, improved engine efficiency in the order of 5% can be achieved under specific conditions. Suitably, the system is adapted to use the electrodes also as a vortex generators achieved by altering the electrical field characteristics (power level, polarity and/or frequency of the electrical power supply). Such a dual use will improve the overall efficiency of an aircraft. The system controlling the vortex generation may generate local disturbance of aerodynamic flow in a controllable manner, in certain locations such as on the wing, vertical fin or air inlets or intakes. The system thus provides for an elimination of physical vortex generators being permanently attached to the airframe, which otherwise would result in drag during all flight conditions. Alternatively, the control unit is adapted for achievement of laminar/turbulent flow over the aerodynamic surface by switching/changing the electrical polarity of the electrodes. The system can preferably be used for controlling laminar and turbulent air flow (laminar or turbulent) over the aerodynamic surfaces for air brake functions as a complement to, or elimination of, conventional moving air brake control surfaces.

Thus is also achieved by the system that a controlled turbulent flow over aircraft surfaces for increased drag can be set, which may be beneficial during the landing procedure.

Preferably, the nano filament belongs to the group of carbon nanotubes (CNT). CNT's can be used in many forms for this purpose, including aligned forests of grown CVD carbon nanotubes, CVD nanotubes grown on carbon fibres and individual arc plasma carbon nanotubes dispersed in polymeric, non-metallic, intermetallic or ceramic matrix systems.

Preferably, a grid with carbon nano tube electrodes, according to the system, is arranged in a mat. The number of electrodes is more than 1000, or even more than 10000. The mat comprises a bus connectable to an adjacent mat comprising carbon nano tube electrodes or a bus connectable to the air frame per se onto which the mat will be mounted onto. This means that more than 1000 conductors, or even more than 10000 conductors, made of nano filaments, each conductor extending through the nano-engineered composite material layer from respective electrode to the bus. The large number of conductors is possible to achieve in the layer due to the application of nano filaments. The large number of electrodes is possible as well due to the application of conductive nano filaments.

By the use of nano filaments for electrodes and conductors in the nano-engineered composite material layer, it is also easy to conform the layer into the desired shape of the airframe. The large number of electrodes and conductors of nano filaments gives a hard (robust) and smooth layer and promotes a system which is capable to address current to earmarked electrodes in specific well defined areas of the air foil's aerodynamic surface. The specific well defined areas are preferable achieved by the use of nano filaments in specific electrode pattern designed for actual airfoil surface use and are achieved by that the conductors are made of conductive nano filaments as well. The application of the carbon nano tubes in the nano-engineered composite material layer will also increase the form stable property of the nano-engineered composite material layer and thus an integrated laminate. The application of nano filaments in the nano-engineered composite material layer will make the dielectric material content within this area to decrease compared with prior art. This will decrease the coefficient of thermal expansion (CTE) of the nano-engineered composite material layer. The aerodynamic surface will thus be form stable due to the nano filaments arranged in the resin matrix.

The nano filaments may be carbon nanotubes, carbon nano fibres, nano wires, etc.

Preferably, the nano filament (CNT, nano fibre, nano multi wall filament, nano double wall filament, nano wire etc.) can be produced with a length of 0.125 mm or less. This is suitable for a common pre-preg ply, typically having a thickness of 0.125 mm used in the production of aircraft. If tilted/leaning, or nano filaments oriented in the plane are used, the length preferably can be longer. The definition of nano means that a filament particle has at least one dimension that is not more than 200 nm. 1 nm (nanometer) is defined as 10-9 meter (0.000 000 001 meter).

Suitably, each electrode is divided into at least two electrode parts, each of which is individually associated with the current supply.

The use of nano filaments for the electrodes and electrode parts provides for such a precise application. The rigid system means that the airfoil moving through the air will have an improved aerodynamic efficiency due to the fine positioning of the electrodes and thus a precise selective activation of the same, at the same time as the strength and the smoothness of the aerodynamic surface enhance the aerodynamic efficiency.

By changing or reverting the polarity, which will promote turbulent airflow instead of laminar flow, increased drag and airbrake performance can be achieved. In case of the changing of polarity, the control unit also controls the current to the electrodes, each of which being larger in area or smaller in area by means of the application of the fine arrangement of electrode parts in each electrode. An upper plane electrode acting as an emitter (one electrode part of this electrode is active making a small electrode area) and a lower plane electrode acting as a receiver (two electrode parts of the lower plane electrode are active making a large electrode area) is applied for one performance. The same upper plane electrode can be controlled to work as a receiver (two electrode parts of the upper plane electrode is used for creating a large electrode area) and the same lower plane electrode can be controlled by the control unit to work as an emitter (one electrode part of which is activated). In such way a precise definition and flexibility in changing of the plasma-enhancing active laminar flow electrodes can be achieved.

Preferably, the air flow sensors comprise nano filaments.

In such way the dielectric material layer and thus the aerodynamic surface will be further reinforced and hard. Thereby is also further prevented cure shrinkage of the dielectric material during the manufacture of the airfoil and also further improved resistance against eventual impacts and damage during appliance and service.

Preferably, the electrodes of the upper plane are adapted to function as air flow sensor means.

The actuators can thus be set in a mode of flow sensor performance.

However also other sensor means are possible, for example air flow sensors, each comprising a hollow tube formed of nano filaments embedded in the dielectric material layer, wherein the hollow tube extends perpendicular to the aerodynamic surface with a mouth ending evenly in the nano-engineered composite material layer's aerodynamic surface for achieving a smooth aerodynamic surface. Those types of air flow sensors are based upon pressure differences. The mouth and the hollow tube of the air flow sensor can be made with such small dimension, due to the application of nano filaments, so that the air flow sensor will not disturb the created laminar flow, but with sufficient dimension for measuring the air flow characteristics.

Preferably, but not required, the system is provided with a plasma-promoting particle releasing device located upstream the electrodes and connected to the control unit for local release of said particles, such as gas or other substances, e.g. in the form of an aerosol. In such way is achieved that a further improved controllable laminar air flow is achieved for short duration and specific flight purposes.

Suitably, the electrodes of the upper and lower plane are adapted to function as air flow sensor means.

In such way is achieved that the air flow sensors are integrated in the nano-engineered composite material layer, wherein a dual function of the electrodes is achieved, i.e. working as actuators and alternatively as air flow sensors. Thereby is achieved that the air flow characteristics (turbulent air flow or laminar air flow) can be detected with high precision and continuously over the nano-engineered composite material layer. By adapting the functionality of the electrodes of the upper plane so that the function as air flow sensors, the production of the nano-engineered composite material layer can be cost-effective. An actuator (an electrode of the upper plane) working in a laminar field of air flow can thereby with high accuracy be distinguished from another actuator (another electrode of the upper plane) working in a turbulent field of air flow, due to the precise location of the air flow sensor means corresponding with the position of the electrodes of the upper plane. The characteristics, such as initial resistance for achieving steady state, are fed to the control unit thereby determining which electrodes (actuators) of the upper plane being present in turbulent and laminar air flow respectively.

Alternatively, the electrodes of the upper plane are arranged above the electrodes of the lower plane and the electrodes of each plane are displaced relative each other in the direction of the air stream.

Thereby is provided that the upper plane electrodes are insulated from the lower plane electrodes as the lower plane electrodes in the dielectric material always will be protected from moisture from rain etc., which prevents the risk for electrical leak reducing the capacity of the system. In some cases it might be beneficial to also protect the upper electrodes from the environment. Preferably, a first electrode configuration (emitter) of the upper plane is cooperating with a second electrode configuration (receiver) in such way that they define an imaginary inclining intersection line which intersects the both electrode configurations.

Thereby said imaginary inclining intersection line and thereby the electrical field can be positioned by the control unit in a precise manner, since an upper plane electrode arranged above a lower plane electrode can act as a emitter, thus shorten the distance between two imaginary intersection inclining lines, at the same time as the electrodes made of nano filaments promote that a very close distance between the upper plane and lower plane electrodes respectively can be provided. The shortened distances between the imaginary inclining intersection lines thus result in a precise system.

Suitably, the nano-engineered composite material layer comprises a dielectric layer, in which the electrodes of the upper and lower plane are arranged insulated from each other.

Thereby the nano-engineered composite material layer can be attached to a metallic airfoil, wherein the lower plane electrodes are arranged a distance from dielectric layer's under side. A robust system is thus achieved, which prevents undesired electric leak between the electrodes.

Alternatively, the nano-engineered composite material layer comprises a dielectric layer of nano filaments.

In such way is achieved that the nano-engineered composite material layer can be manufactured cost-effective, by that the type of nano filaments used for the dielectric feature of the nano-engineered composite material layer is the same as the type of nano filaments used for the electrodes. At the same time a hardness of the aerodynamic surface will be achieved, which promotes the aerodynamic efficiency.

Preferably, the system is adapted to control the manoeuvring of an aircraft.

Thereby control surfaces, such as rudder, elevator, ailerons, flaps etc., can be eliminated or decreased in area. This will improve the aerodynamic efficiency of the aircraft, due to elimination or reduction of steps and gaps in the control surface/wing surface interface. By increasing the laminar air flow over port wing and increasing the turbulent air flow over the starboard wing in a controllable manner by the control unit, the aircraft will turn to the right. The possibility to control the air flow over the smooth and hard aerodynamic surface improves the aircraft manoeuvrability, in some cases allowing reduction of size- or elimination of conventional control surfaces, thus reducing cost and weight.

Suitably, the system is adapted to control the thrust of an aircraft.

In such way an aircraft can be partly propelled by electricity, which, in addition to other benefits, reduces the noise under certain conditions.

Preferably, the control unit is adapted to address current between cooperating electrodes of the upper and lower plane creating plasma fields urging the air flow so that it essentially corresponds with the flight direction.

In such way the system is preferably used in aircrafts having sweep-back wings. Thereby is achieved that "cross flow" effect over the wing can be eliminated or reduced, which otherwise according to known technologies will appear over sweep-back wings. This crossing air flow of a part of the air flow over the current sweep-back wing will pass the wing surface in a direction not coinciding with the flight direction, but flows in a direction towards the wing tip which obstruct the laminar flow. By addressing the current between cooperating electrodes creating a plasma field urging the air flow corresponding with the flight direction, the so called "cross flow" effect will be reduced or eliminated. By arranging the cooperating electrodes in the nano-engineered composite material layer such that they are oriented in an angle to the centre line of the aircraft or by activation of cooperating electrodes such that they create plasma fields oriented in an angle to said centre line, the air flow can be urged towards the fuselage (instead of flowing towards the wing tip) to such degree that the air flow direction corresponds with the flight direction, whereby laminar air flow will be achieved for a sweep-back wing.

Alternatively, the system is adapted to improve the function of a wind turbine blade. Examples of improved function are reduced noise and improved manoeuvrability in changing wind conditions.

Thereby a wind power station's wind turbine blade doesn't need any trim tabs, which improves the efficiency of the wind power station since current trim tabs act as airbrakes.

Furthermore, this means that it is possibly to reduce the service need of high performance wind power stations. The service need for wind power stations located at sea has to be minimized for a cost-effective appliance. The invented technology, if installed on a wind power rotor, may not significantly increase the maintenance costs associated with such a rotor, compared to existing maintenance costs for conventional wind power rotors.

Suitably, the system is adapted to a plasma-enhanced winglet function (reduction of wing tip vortex generation) due to improved controllable laminar flow over upper and lower air foil skin panels in the tip area, allowing reduction in size or elimination of conventional winglet structures. The above is applicable to both aircraft and wind turbines as well as other aerodynamic surfaces such as trains and other high speed vehicles.

The problem to be solved has also been achieved by the nano-engineered composite material layer defined in the introduction being characterized by the features of the characterizing part of claim 12.

In such way a nano-engineered composite material layer is provided which can be used in a plasma-enhanced active laminar flow actuator system in an effective way. The dielectric material layer can be integrally cured with an airfoil or applied onto a current airfoil of metallic or non-metallic material. The nano-engineered composite material layer comprising said components (electrodes, conductors) has, due to the use of nano filaments for these components, a high strength which promotes for a smooth aerodynamic surface. This will be the case when the number of electrodes is high in the nano-engineered composite material layer and especially when the electrodes are arranged in a pattern (grid, hexametric net etc.) of high concentration of electrodes.

Preferably, the nano-engineered composite material layer comprises resin.

BRIEF DESCRIPTION OF THE FIGURES

The present invention will now be described by way of examples with references to the accompanying schematic drawings, of which.

DETAILED DESCRIPTION OF VARIOUS EMBODIMENTS

Figure 1:
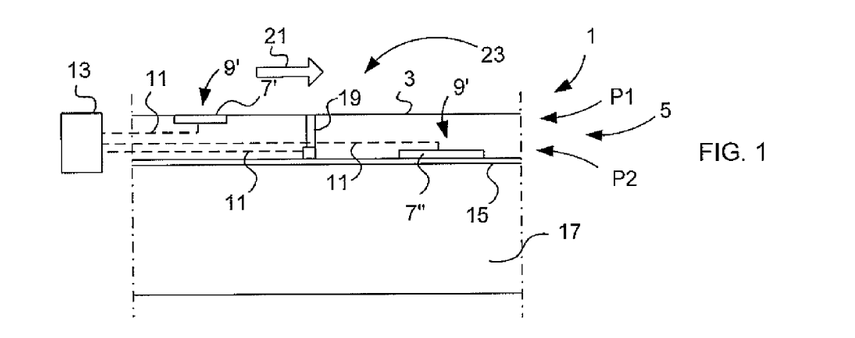
FIG. 1 illustrates an electrode of the upper plane and lower plane electrodes in a nano-engineered composite material layer.

FIG. 1 illustrates a nano-engineered composite material layer 5 comprising electrodes 7', 7" of upper P1 and lower P2 plane in the nano-engineered composite material layer 5. The nano-engineered composite material layer 5 comprises dielectric material, such as a resin. The electrodes 7', 7" are herein also called upper and lower plane electrodes. The upper plane electrode 7' is made of carbon nanotubes 9' (CNT's) embedded in the nano-engineered composite material layer 5 of dielectric material. Said electrode 7' is embedded in the nano-engineered composite material layer in such way that the upper surface or aerodynamic surface 3 is smooth. The second electrode 7", or lower plane electrode, is embedded in the nano-engineered composite material layer 5 at a level below the level in which the upper plane electrode 7' is placed. The dielectric material of the nano-engineered composite material layer is made as a dielectric material. An insulating ply 15 is arranged between the nano-engineered composite material layer and an air frame 17. The electrodes 7', 7" are coupled to a control unit 13 via conductors 11 or wires made of CNT's. An air flow sensor 19 is arranged between the electrodes 7', 7" and is coupled to the control unit 13 via conductor 11. The air flow sensor 19 is adapted to sense air flow 21 characteristics and give signals to the control unit 13 regarding the actual air flow 21 over this specific area 23. The control unit 13 executes commands for controlling current supply between the electrodes 7', 7" for ionizing air generating a plasma field promoting laminar flow over the specific area 23 when the air flow sensor 19 detects turbulent air flow over this specific area 23 of the airfoil.

Figure 2:
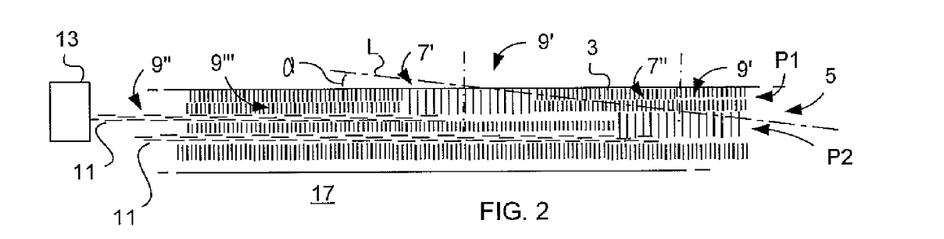
FIG. 2 illustrates in an enlarged view the nano filament structures of the electrodes and conductors embedded in the nano-engineered composite material layer.

FIG. 2 schematically illustrates in an enlarged view in cross section the design of the dielectric material of the nano-engineered composite material layer 5, and also the electrodes 7', 7" and the conductors 11. The dielectric material is arranged orthogonally to the planes P1, P2 in z-direction, thereby also enhancing the strength of the airfoil material comprising large reinforcing fibres (not shown) having a prolongation along the plane of the air frame 17 or airfoil shell. Regarding the conductors 11, the CNT's 9" are arranged with their prolongation in the direction of the current path (i.e. in the plane of the nano-engineered composite material layer 5) and are arranged embedded in the dielectric material. The electrodes 7', 7" are achieved by arranging the CNT's 9' in a conductive property arrangement, i.e. the CNT's 9' of each electrode 7', 7" are arranged less dense for achieving the conductive property but maintaining the mechanical strength of the electrodes 7', 7". An imaginary intersection line L defines an angle α relative the aerodynamic surface 3 of approximately between 15-30 degrees, preferably 20-25 degrees.

Figure 3A:
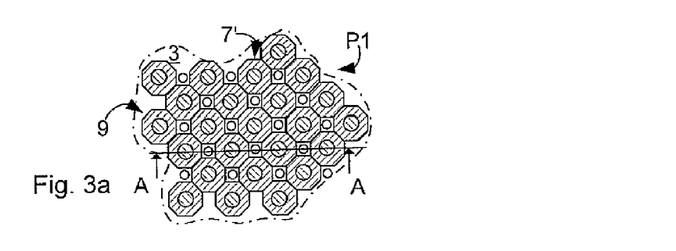
FIGS. 3a-3b illustrate different arrangements of nano filament electrodes within the nano-engineered composite material layer.

FIG. 3a illustrates one possible arrangement of the electrodes 7' of the upper plane P1 in a view from above. Other possible arrangements may use tilted or angled nanotubes. The upper plane electrodes 7' are arranged above the lower plane electrodes 7" (not shown). The electrodes 7', 7" are arranged in a grid. Each electrode 7', 7" is divided into at least two electrode parts 8', 8", each of which is individually associated with the current supply and control unit (not shown). Thereby is achieved that the precise position or area of the aerodynamic surface 3 can be provided with flexibility regarding the generation of a specific plasma field depending upon the required aerodynamic performance. For example, the same area can be ionized with a less amount without the need of altering the voltage supply, mainly by selecting proper electrode part 8', 8", which provides for a flexible and robust system 1. The use of nano filaments 9 for the electrodes and electrode parts provides for such a precise application. The rigid system 1 means that the airfoil moving through the air will have an improved aerodynamic efficiency due to the fine positioning of the electrodes 7', 7" and thus an exact selective activation of the same, at the same time as the strength and the smoothness of the aerodynamic surface 3 enhance the aerodynamic efficiency.

Figures 3B, 10C, 10D, 10E, 10F:
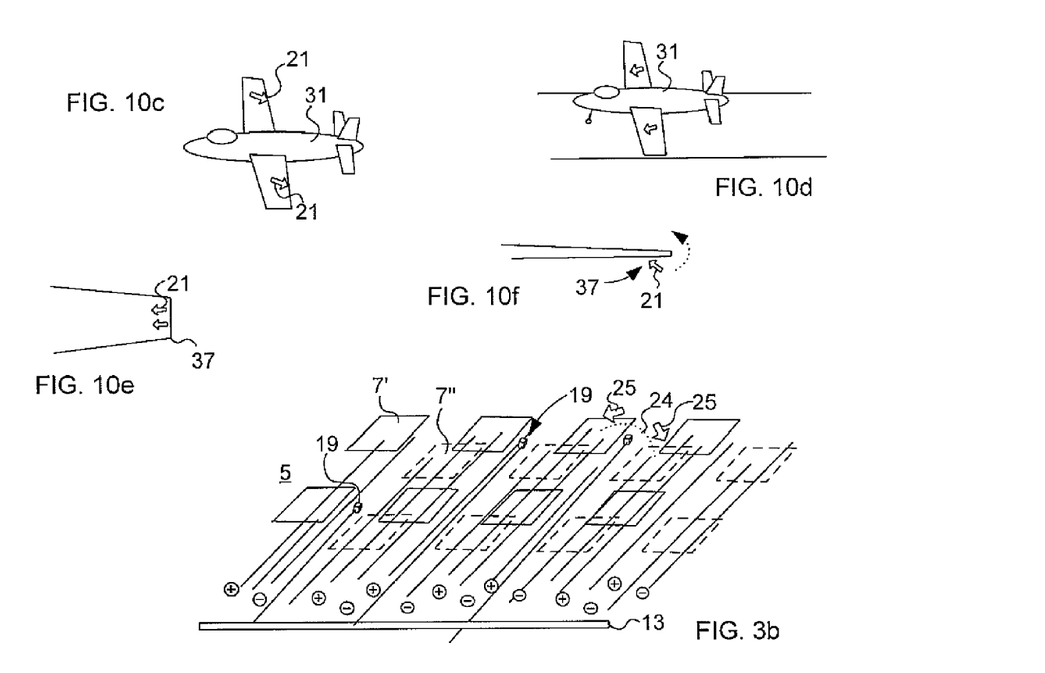
FIGS. 10a-10g illustrate different applications of the system adapted to an aircraft.

FIG. 3b illustrates according to another embodiment where the upper plane electrodes 7' are displaced relative the lower plane electrodes 7" within the nano-engineered composite material layer 5. Airflow sensors 19 made of nano filaments are arranged adjacent the electrodes 7', 7". By changing the polarity of the electrodes 7', 7" the plasma field 24, laminar or turbulent air flow is achieved.

If separate air flow sensors are used they are placed nearer the actuators (the FIG. 3b is only schematic). The placement is dependent on the configuration of the actuators (overlap, no overlap etc. as further embodiments).

Figures 3C, 3D:
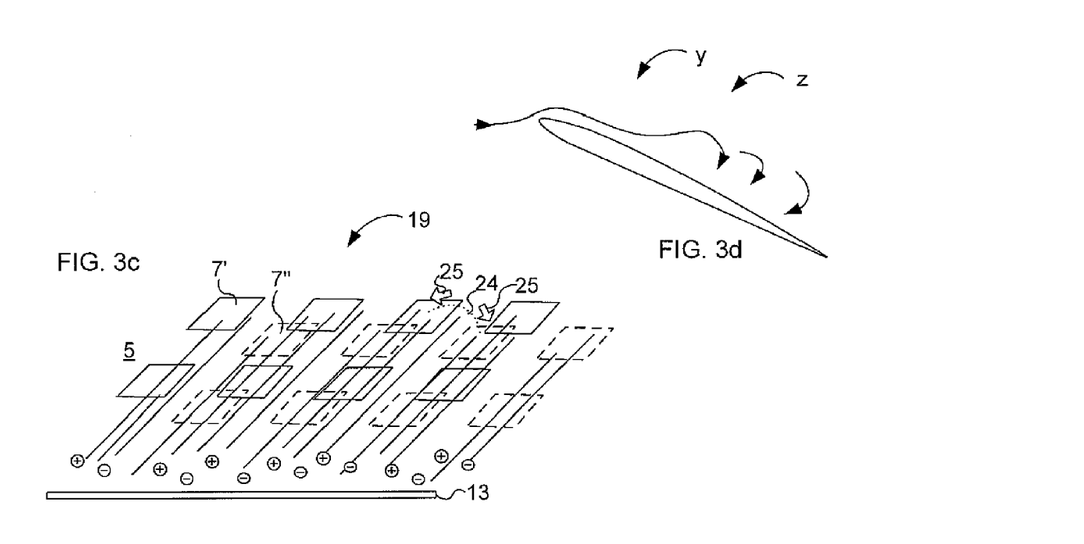
FIGS. 3c-3e illustrate a nano-engineered composite material layer having nano filaments electrodes functioning as air flow sensors as well.

FIG. 3c illustrates a nano-engineered composite material layer having nano filaments electrodes functioning as air flow sensors 19 as well. The upper plane electrodes 7' are connected to the control unit 13 in purpose to feed on one hand signals from the electrode 7' regarding characteristics, such as initial resistance for achieving steady state, on the other hand in purpose to feed current to the electrode 7' working as an emitter or receiver for producing the plasma field. By adapting the functionality of the electrodes 7' of the upper plane so that the function as air flow sensors 19 as well, the production of the nano-engineered composite material layer can be cost-effective. An actuator (emitter) (an electrode of the upper plane) working in a laminar field of air flow can thereby with high accuracy be distinguished from another actuator (another electrode of the upper plane) working in a turbulent field of air flow, due to the precise location of the air flow sensors 19 corresponding with the position of the electrodes 7' (i.e. corresponding with the position of the actuator per se) of the upper plane P1. It shall be noted that the discussed function regards both the upper and lower planes.

Figure 3E:
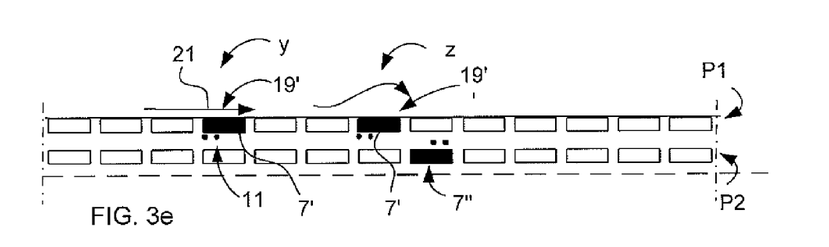

FIG. 3*d* illustrates a wing, wherein the upper aerodynamic surface of the wing in area y, laminar air flow is present, and in area z is turbulent air flow present. In FIG. 3*e* is shown the electrodes 7' of the upper plane P1, which electrodes 7' also are adapted to work as air flow sensors 19. In area y, the airflow sensor 19' indicates air flow characteristic as laminar air flow. In area z, the air flow sensor 19" indicates air flow characteristic as turbulent air flow. As the electrodes 7' are adapted to work as air flow sensors as well, the precise position of the transmission zone between area y and z can be detected, and the downstream electrode 7' (seen in the direction of the air flow) can be set in operating state and cooperating with the electrode 7" of the lower plane P2, for creating a plasma field urging the air flow towards the wing surface thus eliminating the turbulent flow in area z.

Figure 3F:
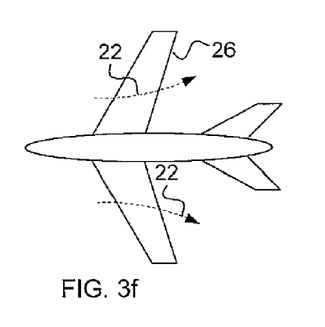
FIGS. 3f-3h illustrate the system adapted to a sweep-back wing aircraft.
Figure 3G:
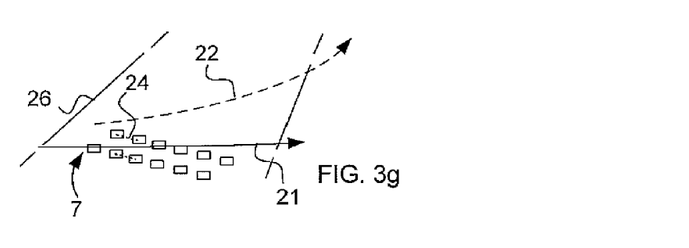
Figure 3H:
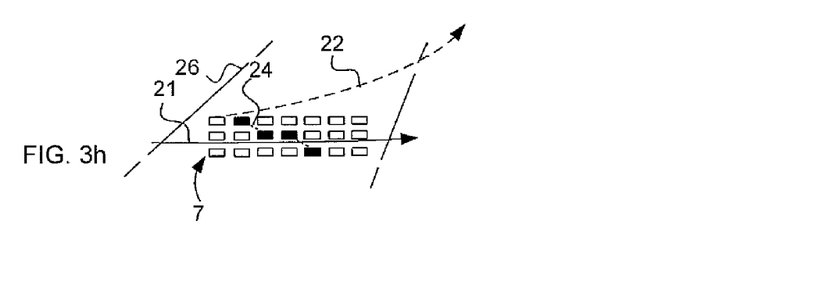

FIGS. 3*f*-3*h* illustrate the system adapted to a sweep-back wing aircraft.

FIG. 3*f* shows an aircraft having deactivated system. A "crossing air flow" of a part of the air flow over the current sweep-back wing 24 will pass the wing surface in a direction not coinciding with the flight direction, but flows in a direction towards the respective wing tip, which will obstruct the laminar flow.

FIG. 3*g* shows a first example of a system in a sweep-back wing aircraft wherein the electrodes (or actuators/emitters/receivers) are arranged in series, each series being angled towards the flight direction for urging the air flow 22 so that it essentially corresponds with the flight direction. I.e., by activation of a plasma field 24 between two cooperating electrodes 7, the plasma field urges the air flow so that it essentially corresponds with the flight direction, thus creating the air flow 21.

FIG. 3*h* shows another example of a system in a sweep-back wing aircraft, wherein electrodes are arranged linear with the flight direction. These electrodes 7 can be activated diagonally so that a plasma field 24 will occur having a prolongation defining an open angle relative the flight direction, thereby urging the air flow 21 so that it flows parallel with the flight direction.

Figure 4A:
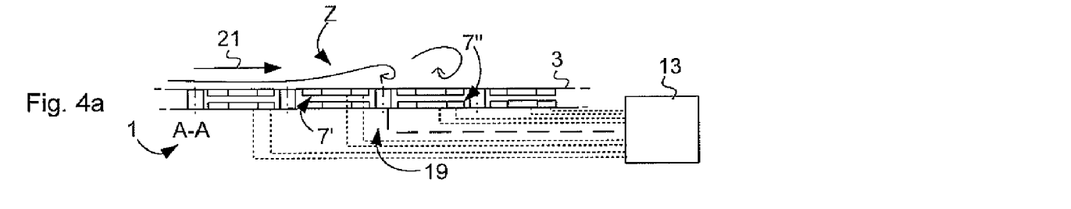
FIGS. 4a-4e illustrate the control of enhanced laminar flow over the aerodynamic surface in one and same specific area.
Figure 4B:
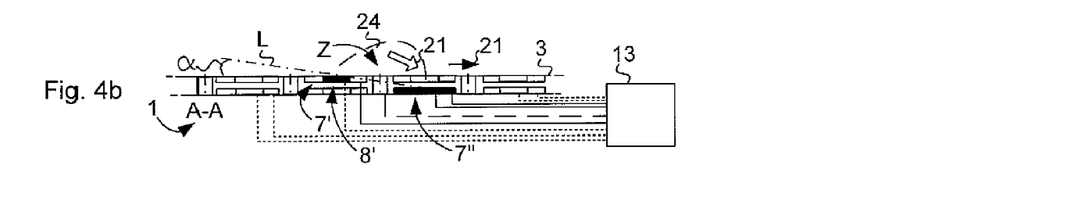

The FIGS. 4*a*-4*e* illustrate a cross-section A-A taken in FIG. 3*a*. FIG. 4*a* shows air flow 21 flowing over the aerodynamic surface 3. At a certain point Z the air flow 21 releases from the aerodynamic surface 3 and a turbulent flow occurs. The actual position for this turbulence is detected by the air flow sensor 19 feeding a signal to the control unit 13, which feeds a current to the selected upper plane electrode's 7' central electrode part 8', which creates a ionized field between this electrode part 8' and a selected lower plane electrode 7", so as to force down the air flow 21 towards the aerodynamic surface 3 thus maintaining the laminar flow over the point Z, as being shown in FIG. 4*b*.

Figure 4C:
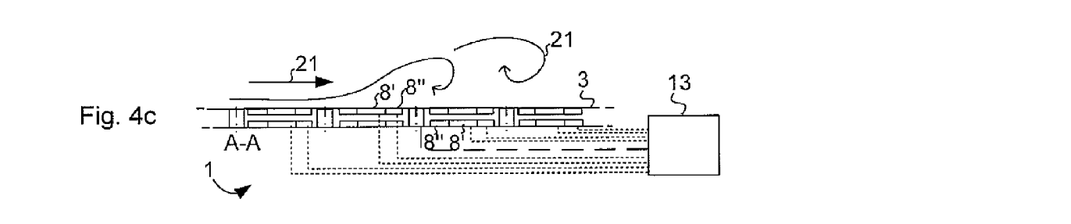
Figure 4D:
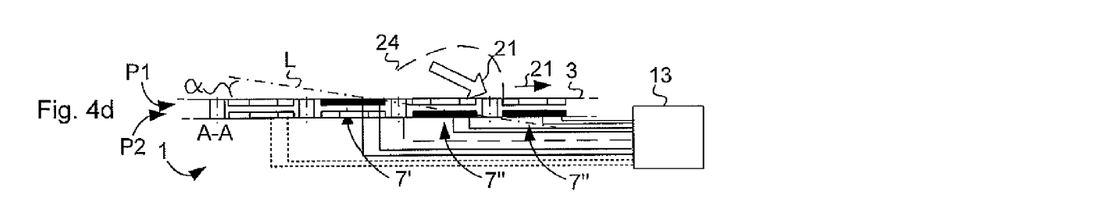

In the following by means of FIGS. 4*c* and 4*d* is explained that the electrodes 7', 7" may work as emitters or receivers independently of their positions in the layer's planes by means of the rigid system 1. Both electrode parts 8', 8" of the upper plane electrode 7' may act as an emitter ionizing the air and two electrodes 7" of the lower plane act as a receiver unit, to draw the ionized air flow by means of the creation of a first electric field suitable for a first aircraft performance. The same upper plane electrode's 7' central electrode part 8' and elected lower plane electrode 7" (see FIG. 4*e*) cooperates for creating an air brake. The air flow sensors 19 are coupled to the control unit 13 to form a closed loop system, allowing further reduction of the overall power consumption. The embodiment where changing of polarity is performed is described in connection with FIG. 11 below.

Figure 4E:
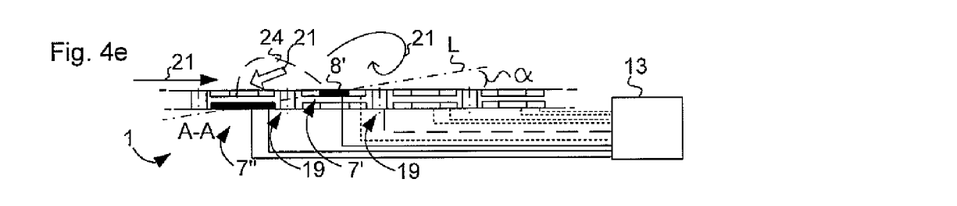

The first electrode configuration (electrode parts 8', 8") (emitter) of the upper plane P1 cooperates with the second electrode configuration (electrode parts 8', 8") (receiver) of the lower plane P2, or vice versa, in such way that they define an imaginary inclining intersection line L, which intersects the both electrode configurations mainly in such way that said imaginary intersection line L defines an angle α relative the aerodynamic surface 3 of approximately between 15-30 degrees, preferably 20-25 degrees.

Figures 5A, 5B:
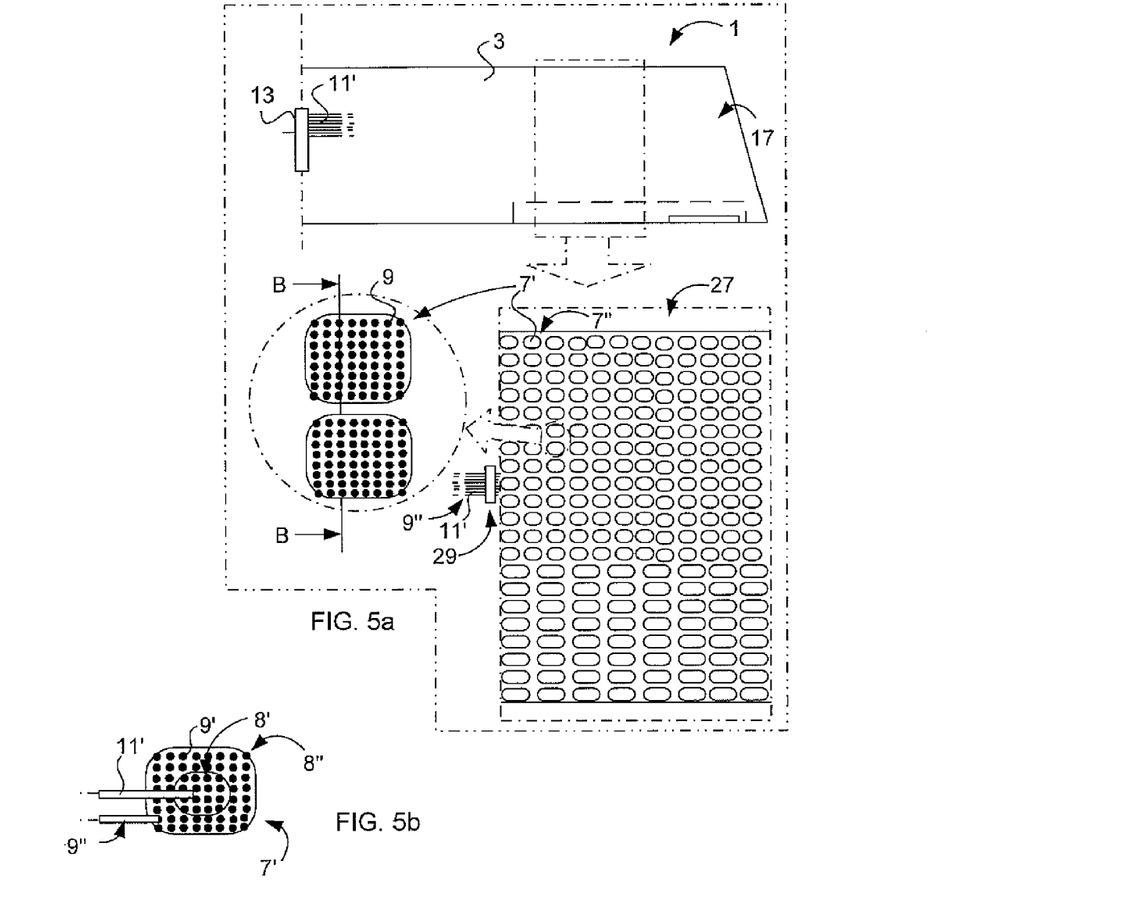
FIGS. 5a-5b illustrate a further embodiment of the system.

FIG. 5*a* illustrates a portion of an airfoil (air frame 17). The airfoil's aerodynamic surface 3 is comprised in a system 1. Several plasma generating electrodes 7' (electrodes 7" below the upper plane electrodes 7' are not shown) made of nano filaments 9, increasing the strength and reinforcing the airframe's 17 composite laminate, are arranged widely over the aerodynamic surface 3. Each electrode 7', 7" is connected via wires 11' made of nano filaments 9" to the control unit 13 via chips 29 connectable to each other. The system 1 is divided in several mats 27 and each mat 27 comprises connection chips 29. The mat 27 is easily replaced in the event of damage of the aerodynamic surface, due to bird collision etc. The mat 27 (nano-engineered composite material layer) is made as a film or tape, which by means of adhesive can be attached directly to the air frame structure.

FIG. 5*b* illustrates wires 11' of nano fibres 9", which wires 11' are coupled to respective electrode part 8', 8" of each upper plane and lower plane electrodes 7', 7".

Figure 6:
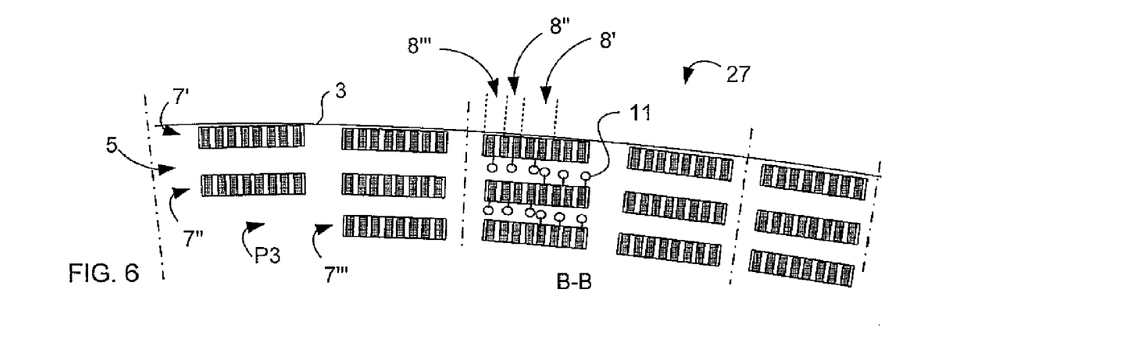
FIG. 6 illustrates a cross-section of the mat in FIG. 5a in section B-B.

FIG. 6 illustrates a cross-section of the mat in FIG. 5*a* in section B-B. The mat 27 comprises a further electrode plane P3 including a plurality of electrodes 7''' and each electrode 7', 7", 7''' is divided into three electrode parts 8', 8", 8'''. The nano-engineered composite material layer 5 will present a high strength and at the same time the plurality of electrodes 7', 7", 7''' made of conductive nano filaments will promote plasma fields (regarding their location and power) can be controlled by the control unit 13 (not shown) in well defined precise areas depending upon desired needs.

Figure 7A:
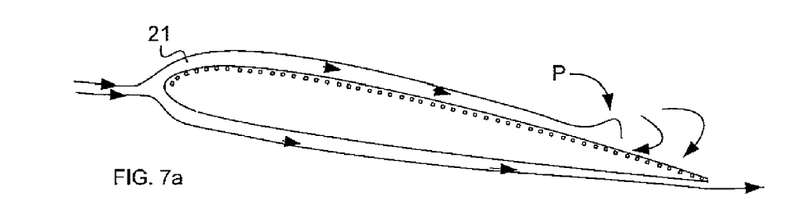
FIGS. 7a-7c and FIGS. 8a-8d illustrate the precise performance of the system at the same time providing a hard and smooth aerodynamic surface enhancing the efficiency.
Figure 7B:
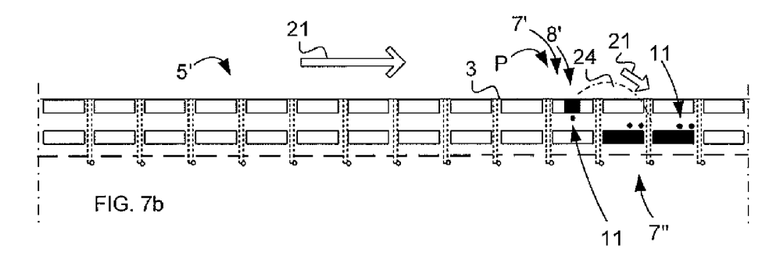
Figure 7C:
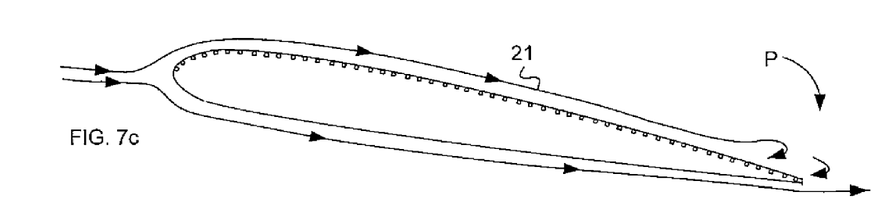

FIG. 7*a* illustrates a cross-section of an airfoil. It is shown that for a certain attitude of the airfoil relative the air flow 21, turbulence occurs at point P detected by a sensor (not shown). This point P is schematically illustrated in FIG. 7*b* showing the nano filament electrodes 7', 7" arranged within a dielectric material layer 5'. Upper plane electrode part 8' is activated via a nano filament conductor 11 for co-operation with lower plane electrodes 7" (electrode parts) via four nano filament conductors 11 thus creating a plasma field 24 urging the air flow 21 towards the aerodynamic surface 3 at the point P. FIG. 7*c* illustrates that the air flow 21 at point P thus will be laminar.

Figures 8A, 9:
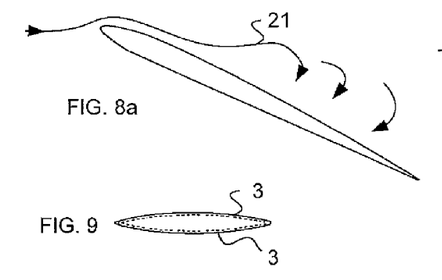
FIG. 9 illustrates a system adapted to both sides of an airfoil for controlling the air stream over the aerodynamic surface.
Figure 8B:
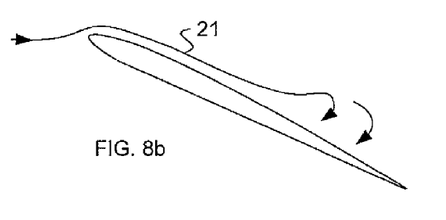
Figure 8C:
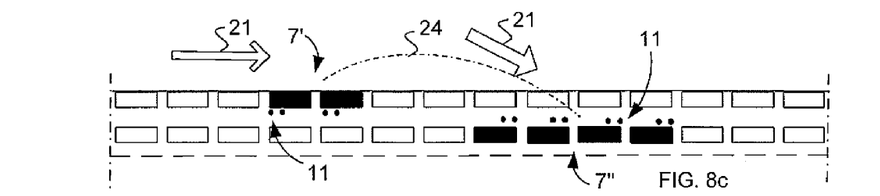

FIG. 8*a* illustrates another attitude where the turbulent flow is of greater amount. The control unit (not shown) is adapted to control several electrodes (not shown) to co-operate for creating a strong plasma field urging the air flow 21 with a greater force towards the aerodynamic surface as being shown in FIGS. 8*b* and 8*c*, simply by using some of the electrodes corresponding to those used for the attitude in FIG. 7*a* and additional electrodes.

Figure 8D:
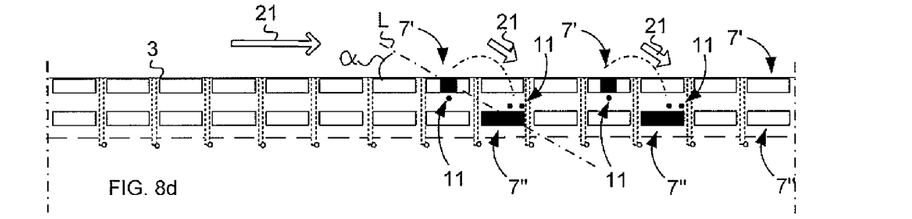

FIG. 8d illustrates two pairs of upper plane and lower plane electrodes 7', 7" co-operating in series for enhancing the laminar air flow 21.

FIG. 9 illustrates the system 1 is arranged to both sides of an airfoil for controlling the air stream over the aerodynamic surface 3.

Figure 10A:
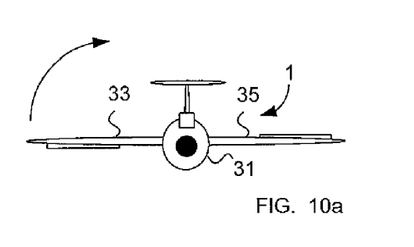
Figure 10B:
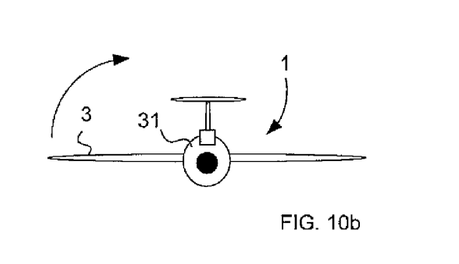
Figure 10G:
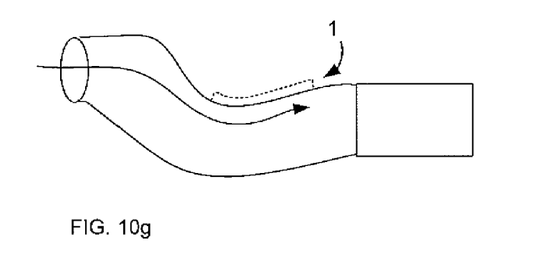
Figure 10H:
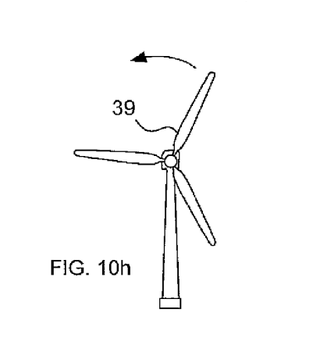
FIG. 10h illustrates a wind power station comprising the system.

FIG. 10a-10f illustrate different applications of the system 1 adapted to an aircraft 31. FIG. 10a shows improvement of the aileron control surface by increasing the laminar flow over starboard wing 33 and creating turbulence over port wing 35 by means of the system 1. FIG. 10b shows an aircraft 31 not having any control surfaces, wherein the aircraft 31 is adapted with the system 1 for manoeuvre the aircraft. FIG. 10c shows an aircraft 31 propelled by the system 1, by forcing the air flow backwards by means of creating symmetrical forces urging the air flow 21 backwards. The aircraft in FIG. 10c comprises electrodes over wings, fuselage, stabilizer, fin according to the system 1. FIG. 10d shows an aircraft just before touch down, where the system fully activates turbulent flow around the wings for reaching a short landing performance, by simply switching the polarity and switching the size of the electrode areas by using the system 1 (see FIG. 4e and FIG. 11 for example) comprising electrode parts 8', 8" in upper and lower plane. FIG. 10e shows an aircraft comprising the system adapted to the wing tips 37. The air flow 21 is forced under the wing tip's underside towards the wing centre for decreasing the vortex effects at the wing tip, as shown in FIG. 10f. FIG. 10g shows the system 1 adapted for an engine air intake for creating a laminar air flow and FIG. 10h shows a wind turbine blade 39 comprising the system 1.

Figure 11:
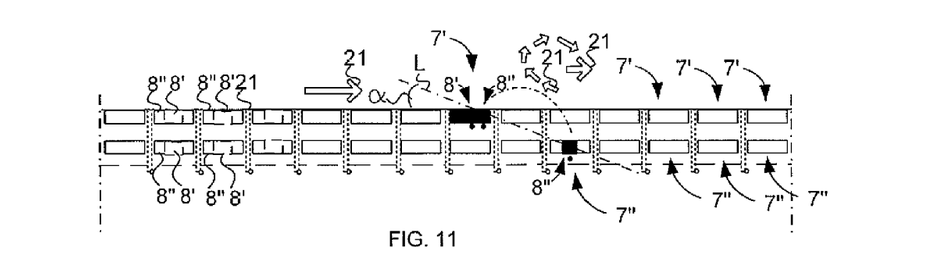
FIG. 11 illustrates the system in FIG. 10d adapted for air brake functionality.

FIG. 11 illustrates the system in FIG. 10d for creating an air brake. Same electrodes as being used in FIG. 8d are used, but for a different purpose, namely to force the airflow towards the main air flow direction. This is made by changing polarity between the upper plane and lower plane electrode 7', 7". Also will be a switch from a small electrode surface to a large electrode surface for the upper plane electrode 7', by activating also electrode part 8" of the upper plane electrode 7'. There is also a switch from a large electrode surface to a smaller electrode surface for the lower plane electrode 7" by not using electrode part 8" of lower plane electrode 7".

The present invention is of course not in any way restricted to the preferred embodiments described above, but many possibilities to modifications, or combinations of the described embodiments, thereof should be apparent to a person with ordinary skill in the art without departing from the basic idea of the invention as defined in the appended claims.

The nano filaments can be embedded in the nano-engineered composite material layer or mat in such way that a portion of the nano filaments is exposed in the aerodynamic surface. This means that a portion of the nano structure is exposed (but not protruding) in the airfoil surface providing a hard surface and satisfactory conductive properties for ionized air.

Alternatively, the dielectric material is achieved by arranging the CNT's 9''' in the dielectric material so compact that the conductivity ceases and by arranging them with orthogonally to the planes P1, P2 in z-direction, thereby also enhancing the strength of the airfoil material comprising large reinforcing fibres (not shown) having a prolongation along the plane of the air frame 17 or airfoil shell. The CNT's can be produced by emerging CNT technology resulting in grown forests of CNT for high efficiency. It is known that CNT's preferably are grown in the shape of "forests" (mats of aligned CNT's) with vertical, tilted or horizontally arranged nano tubes. Combinations of these arrangements are also possible, e.g. as two or more separate layers stacked on top of each other. It is also possible to grow CNT's as well-defined patterns, suited for the intended application. The term CNT is this application includes all types of carbon nano tubes. These can be single-wall, double-wall or multi-wall nano tubes. In addition, CNT-like materials like graphene, graphone and similar carbon-based materials with suitable electrical and thermal properties can be used. The composite matrix of the outer ply/outer layer (forming surface) can be epoxy, polymides, bismaleimides, phenolics, cyanatester, PEEK, PPS, polyester, vinylester and other curable dielectric materials or mixtures thereof. If used, the large fibre structure may be of ceramic, carbon and metal or mixtures thereof.

The invention claimed is:

1. A plasma-enhanced active laminar flow actuator system (1) adapted to an aerodynamic surface (3), said system (1) comprising:
   a set of electrodes arranged (7', 7") in at least an upper (P1) and a lower (P2) plane extending parallel with the aerodynamic surface (3);
   conductors (11, 11') arranged for electrical communication between a control unit (13) and each of the electrodes (7', 7"); and
   a nano-engineered composite material layer (5) of the aerodynamic surface comprising said set of electrodes (7, 7"),
   wherein:
      the control unit (13) is adapted to address at least one of a current or a voltage between cooperating electrodes (7', 7") of the upper and lower plane (P1, P2) from a current supply;
      an upper plane electrode (7') of the cooperating electrodes acts as an emitter ionizing the air and a lower plane electrode (7") of the cooperating electrodes acts as a receiver to draw the ionized air flow by means of a first electric field, thereby forming an actuator;
      the electrodes (7', 7") comprise at least one of nano-sized filaments or graphene;
      the conductors (11, 11') comprise at least one of nano-sized filaments or graphene
      the electrodes (7') of the upper plane (P1) are arranged in the aerodynamic surface (3) such that they define a smooth aerodynamic surface (3);
      at least one of the nano-sized filaments or graphene of the electrodes and conductors (11,11') are embedded in the nano-engineered composite material layer (5); and
      the control unit (13) is adapted to address at least one of the current or the voltage between the cooperating electrodes (7', 7") of the upper and lower plane (P1, P2) from the power supply depending upon air flow characteristic signals fed from air flow sensor means (19).

2. The system according to claim 1, wherein each electrode (7', 7") is divided into at least two electrode parts (8', 8"), each of which is individually associated with the current supply.

3. The system according to claim 1, wherein the air flow sensor means (19) comprise at least one of nano-sized filaments or graphene.

4. The system according to claim 1, wherein the electrodes (7') of the upper plane (P1) are arranged above the electrodes (7") of the lower plane (P2).

5. The system according to claim 1, wherein the nano-engineered composite material layer (5) comprises a dielectric layer of packed nano-sized filaments or graphene arranged to insulate the electrodes from each other.

6. The system according to claim 1, wherein:
the aerodynamic surface is an aerodynamic surface of an aircraft; and
the system (1) is adapted to control the action of the aerodynamic surface.

7. The system according to claim 1, wherein the system (1) is adapted to control a thrust supplement of an aircraft (31).

8. The system according to claim 1, wherein the control unit (13) is adapted to address at least one of the current or the voltage between cooperating electrodes (7', 7") of the upper and lower plane (P1, P2) creating plasma fields urging the air flow so that it essentially corresponds with the flight direction.

9. The system according to claim 1, wherein the upper plane electrodes are arranged to feed signals from the electrode to the control unit regarding electromagnetic characteristics present when achieving steady state laminar flow, thereby determining which electrodes of the upper plane being present in turbulent and laminar air flow respectively, whereby the functionality of the upper plane electrodes of the upper plane are adapted so they function as air flow sensors as well.

10. The system according to claim 1, wherein the composite material layer is applied in an engine air intake or engine outlet.

11. The system according to claim 1, wherein the system is arranged to control the manoeuvring of an aircraft.

12. The system according to claim 1, wherein the system is used for controlling at least one of a laminar or a turbulent air flow over the aerodynamic surfaces of an airfoil including for air brake functions as at least one of a complement to or an elimination of conventional moving air brake control surfaces.

13. The system according to claim 1, wherein the actuators, air flow sensor means and control form a closed loop system for improved efficiency laminar flow, thereby minimizing the power consumption of the system.

14. The system according to claim 1, wherein the electrodes comprise two or more layers of nano-sized filaments or graphene placed on top of each other.

15. The system according to claim 5, wherein at least some of the conductors are in electrical communication with an electrical bus or chip, wherein a number of chips are configured in the dielectric material layer to be attached to the same bus, thereby forming an intelligent system where plasma fields can be formed over precise portions or areas of the airfoil.

16. The system according to claim 1, wherein the aerodynamic surface is an outer surface of a non-metallic, metallic, intermetallic or ceramic airfoil, or any combination of such materials.

17. The system according to claim 1, wherein the nano-engineered composite material layer comprising the electrodes and conductors form a separate film, which is designed to be attached to an airfoil surface.

18. The system according to claim 1, wherein the system is configured for de-icing and wherein the system is configured for re-attachment of laminar flow down-stream ice build-up.

19. The system according to claim 1 applied in aircraft engine air intakes, wherein the actuators are controlled based on the flight conditions such as an angle of attack.

20. The system according to claim 1, wherein the composite material layer is applied in an air intake such as an air intake of an environmental control system or a cooling system, thereby improving the efficiency under various operational conditions.

21. The system according to claim 1, wherein the system is configured to generate vortex, e.g. by altering the electrical field characteristics such as power level or polarity and/or frequency of the electrical power supply.

22. The system according to claim 1 wherein the control unit is arranged to alter the air flow between laminar and turbulent by switching or changing the electrical polarity of the electrodes.

23. The system according to claim 22, wherein the control unit is arranged to alter the air flow so as to obtain air braking.

24. The system according to claim 1 wherein the nano-engineered composite material layer comprises nano-sized filaments or graphene and/or non-metallic, intermetallic or ceramic matrix materials.

25. System comprising a plurality of plasma-enhanced active laminar flow actuator systems according to claim 1, wherein the plurality of systems are at least one of controlled or activated individually and simultaneously.

26. The system according to claim 1, wherein the set of electrodes are arranged in at least a third plane and wherein the control unit is arranged to reconfigure configuration of cooperating electrodes forming an actuator so as to comprise an electrode from the at least one third plane.

27. The system according to claim 1, wherein the upper plane electrodes that are partially or fully exposed to the air stream, in addition to their function as actuator electrodes, function as the air flow sensor means.

28. The system according to claim 1 wherein the air flow sensor means a comprises nano-sized filaments or graphene material in which a hole is formed, wherein the air flow sensor means is arranged to measure pressure differences between laminar flow areas and turbulent flow areas.

29. The system according to claim 1, further comprising a plasma-promoting particle releasing device arranged to release plasma-promoting particles in the airstream as an aerosol.

30. The system according to claim 1 wherein the upper and lower electrodes are configured to function as airflow sensors.

31. The system according to claim 1, further comprising a dielectric layer insulating the plasma-enhanced active laminar flow actuator system from an airfoil surface on which it is supported.

32. The system according to claim 1 wherein the configuration and positioning of the electrodes is tailored to minimize the effect of cross-flow obstructing the laminar flow.

33. The system according to claim 1 configured for wind power blades, wherein the positioning of the electrodes is tailored to enable adjustment to changing wind conditions to minimize the effect of cross-flow obstructing the laminar flow.

34. The system according to claim 1 wherein the system is configured to reduce vortex generation due to due to improved and directed laminar flow in airfoil areas where vortices typically are formed.

35. The system according to claim 34, wherein the system is configured to reduce wing tip vortex generation due to reduced airflow leakage between upper and lower wing panels in wing tip areas, thereby enhancing or acting as a winglet on an aircraft wing.

36. The system according to claim 1, wherein the power supply is a voltage supply.

37. The system according to claim 1, comprising a plurality of lower planes and wherein the control unit is adapted to address current/voltage between cooperating electrodes of the upper and a selected one of the lower planes, wherein the lower plane is selected based on the aerodynamic conditions.

38. The system according to claim 1, wherein the actuators are configured to operate in series and wherein the control unit is arranged to send pulses of high voltage actuator signals to consecutive actuators.

39. The system according to claim 1 wherein the surfaces of at least one of the upper plane electrodes is sectioned and wherein the control unit is arranged for selective activation of the respective sectioned electrode surface, whereby the surface area the upper plane electrode can be altered to promote laminar flow.

40. The system according to claim 1 wherein the electrodes or conductors or nano-engineered composite material layer comprises carbon nanotubes, CNTs, such as grown "forests" or mats of aligned CNTs with vertical, tilted or horizontally arranged nanotubes or CNTs arranged in a defined pattern, or graphene or matrix materials such as epoxy or polyimide or bismaleimides or phenolics or cyanate esters or PEEK or PPS or polyester or vinylester.

41. The system according to claim 1, wherein the electrodes, conductors and sensors can be made very small and thin due to the use of nano-sized filaments or graphene with high electrical conductivity and mechanical strength, allowing more actuators, connectors and sensors per surface area and thereby an improved overall system efficiency, compared to systems based on micrometer-sized material additions.

42. A plasma-enhanced active laminar flow actuator system configured to reduce aerodynamic noise due to turbulent flow from non-airfoil surfaces such as aircraft landing gear components, the system comprising:
 a set of electrodes arranged in at least an upper and a lower plane extending parallel with the surface;
 conductors arranged for electrical communication between a control unit and each of the electrodes; and
 a nano-engineered composite material layer of the surface comprising said set of electrodes,
 wherein:
  the control unit is adapted to address current/voltage between cooperating electrodes of the upper and lower plane from a power supply,
  an upper plane electrode of the cooperating electrodes acts as an emitter ionizing the air and a lower plane electrode of the cooperating electrodes acts as a receiver to draw the ionized air flow by means of a first electric field, thereby forming an actuator,
  the electrodes comprise nano-sized filaments or graphene,
  the conductors comprise nano-sized filaments or graphene,
  the electrodes of the upper plane are arranged in the surface such that they define a smooth aerodynamic surface,
  the nano-sized filaments or graphene of the electrodes and conductors are embedded in the nano-engineered composite material layer and
  the control unit is adapted to address current/voltage between the cooperating electrodes of the upper and lower plane from the power supply depending upon air flow characteristic signals fed from air flow sensor means.

43. A plasma-enhanced active laminar flow actuator system adapted to an aerodynamic surface, the system comprising:
 a set of electrodes arranged in a nano-engineered composite material layer of the aerodynamic surface, and
 conductors arranged in the a nano-engineered composite material layer for electrical communication between a control unit and each of the electrodes;
 wherein:
  the control unit is adapted to address current/voltage between cooperating electrodes from a power supply, wherein a first one of the cooperating electrodes acts as an emitter ionizing the air and a second one of the cooperating electrodes acts as a receiver to draw the ionized air flow by means of a first electric field,
  the electrodes comprise nano-sized filaments or graphene,
  the conductors comprise nano-sized filaments or graphene,
  at least some of the electrodes are arranged in the aerodynamic surface such that they define a smooth aerodynamic surface,
  the nano-sized filaments or graphene of the electrodes and conductors are embedded in the nano-engineered composite material layer, and
  the control unit is adapted to address current/voltage between the cooperating electrodes from the power supply depending upon air flow characteristic signals fed from air flow sensor means.

* * * * *